United States Patent [19]

Diethelm et al.

[11] Patent Number: 5,270,131
[45] Date of Patent: Dec. 14, 1993

[54] MODULE FOR A FUEL CELL BATTERY

[75] Inventors: Roland Diethelm, Bauma; Joseph Brun, Winterthur; Bruno Barp, Rudolfstetten, all of Switzerland

[73] Assignee: Sulzer Brothers Limited, Winterthur, Switzerland

[21] Appl. No.: 784,903

[22] Filed: Oct. 30, 1991

[30] Foreign Application Priority Data

Dec. 11, 1990 [CH] Switzerland ............ 03916/90-7

[51] Int. Cl.$^5$ ............................................. H01M 8/10
[52] U.S. Cl. ............................................. 429/34; 429/30; 429/32; 429/33; 429/35; 429/36; 429/38; 429/39
[58] Field of Search .............. 429/34, 35, 36, 38, 429/39, 30, 32, 33

[56] References Cited

U.S. PATENT DOCUMENTS 5,034,288  7/1991  Bossel .................................. 429/32

FOREIGN PATENT DOCUMENTS

| | | |
|---|---|---|
| 0378812 | 7/1990 | European Pat. Off. . |
| 0410159 | 1/1991 | European Pat. Off. . |
| 0419163 | 3/1991 | European Pat. Off. . |
| 0432481 | 6/1991 | European Pat. Off. . |
| 0437175 | 7/1991 | European Pat. Off. . |
| 3918115 | 12/1990 | Fed. Rep. of Germany . |
| 4016157 | 12/1990 | Fed. Rep. of Germany . |
| 2306540 | 10/1976 | France . |
| 1-313855 | 12/1989 | Japan . |
| 2-15564 | 1/1990 | Japan . |
| 2-94366 | 4/1990 | Japan . |
| 2-940365 | 4/1990 | Japan . |
| 2-207456 | 8/1990 | Japan . |

Primary Examiner—Prince Willis, Jr.
Assistant Examiner—M. Nuzzolillo
Attorney, Agent, or Firm—Kenyon & Kenyon

[57] ABSTRACT

The module for a fuel cell battery comprises an electrochemically active plate which, on the one hand, consists of an oxide-ion-conducting solid electrolyte and, on the other hand, two electrode layers applied to both sides of the electrolyte layer. At least one of the electrode layers is electrically conductively and nondetachably connected to a supporting and electron conduction structure via a plurality of regularly disposed contact elements.

15 Claims, 3 Drawing Sheets

MODULE FOR A FUEL CELL BATTERY

This invention relates to a module for a fuel cell battery and to fuel cell batteries comprising such modules.

In solid electrolyte fuel cells, the fuel gas—which consists predominantly of hydrogen and/or carbon monoxide and/or methane—reacts with oxygen ions at a negative electrode (anode) to form water and/or carbon dioxide while electrons are being liberated. The oxygen which originates from air has molecules which dissociate at a positive electrode (cathode) and are ionized with the absorption of electrons. The oxygen ions diffuse through the solid electrolyte which is usually in the form of a thin gas-tight layer between two porous electrode layers, and which is oxide-ion-conductive at higher temperatures (above approximately 1100° K.). Various types of solid electrolyte fuel cells are known, for example see Brian Riley "Solid Oxide Fuel Cells—the Next Stage" in Journal of Power Sources, 29 (1990) 223-237.

EP 0 055 011 discloses a device comprising a plurality of tubular fuel cells. As described, each, fuel cell consists of a porous air-permeable carrier tube, on the outer surface of which the anode, solid electrolyte and cathode are applied in the form of thin superposed layers. The fuel cell is closed at one end. A feed tube for the air leads to the interior of the carrier tube at the closed end of the fuel cell. The feed tube also acts as a heat-exchanger. The air already preheated in a recuperator outside the device absorbs heat on transport through the feed tube and this heat is liberated in the electrochemical reactions. The advantage of a device with fuel cells of this kind is that no seals are necessary between the air spaces and the gas spaces. On the other hand, there is the disadvantage that the manufacture of such fuel cells is complicated and hence expensive.

In another known type of fuel cell comprising solid electrolytes, the electrochemically active element is a flat square a plate in the form of a thin layer, on both sides of which the electrode layers are applied. In this case, there is no need for the air to diffuse through a porous carrier structure. Fuel cells of this kind can be made much more cheaply than the tubular ones. There are, however, serious problems, namely with the seal between the gas and air spaces and in connection with thermal stresses.

These problems are less serious in the case of a fuel cell battery comprising flat and centrally symmetrical cells in which air spaces can be separated from gas spaces by simple means and in which strains due to different thermal expansions are small such as described in EPA 0 437 175. This centrally symmetrical fuel cell battery has a modular construction. Feed elements for gas and air, together with the electrochemically active plates arranged alternately, form a stack with the two components together substantially forming a module in each case. In this fuel cell battery a gas and air feed element comprises a hollow member in the form of a plate which acts as a heat-exchanger for the incoming air in a similar manner to the feed tube in the above-mentioned tubular fuel cell. Only one annular seal is necessary in the center of the cell for each cell or stage. Also, electrochemically active plate is integrated into the module as a separable component.

When the fuel cell battery is in operation, temperature gradients which may result in thermal stresses occur in the radial direction. The rotationally symmetrical construction with the special integration of the electrochemically active plates allows thermal expansion, which is not greatly obstructed and therefore produces only minor thermal stresses.

The electron conduction along the surfaces of the electrode layers is associated with high electrical resistances. To minimize the resistance losses, contact locations must be distributed over the entire electrode surface to allow electron transport to take place. However, since the electrochemically active plate is very thin and fragile and since the plate is integrated into the module in the form of a separable component, there is a risk, on assembly of the module and also on assembly of the fuel cell battery from the modules, that an electrochemically active plate may be damaged.

Accordingly, it is an object of the invention to support the fragile electrochemically active plate of a fuel cell battery module in a secure manner.

It is another object of the invention to reduce the risk of breakage of an electrochemically active plate in a fuel cell battery module.

It is another object of the invention to reduce the risk of breakage of fragile electrochemically active plates during assembly of a module for a fuel cell battery.

Briefly, the invention provides a module for a fuel cell battery which is comprised on an electrochemically active plate, a supporting and electron conduction structure and a plurality of regularly disposed contact elements secured to and between the supporting structure and the plate in electrically conductive and fixed relation.

The electrochemically active plate is constructed of a pair of electrode layers and an oxide-ion-conducting solid electrolyte layer between the electrode layers. In addition, the supporting structure is spaced from and is disposed in parallel with the electrochemically active plate. Still further the contact elements are secured between the supporting structure and one of the electrode layers of the plate.

The invention also provides a fuel cell battery comprised of a plurality of such modules disposed in stacked relation and in electrically connected series. In this case, a second plurality of contact elements are secured to and between the electrode layer of the electrochemically active plate of one module and the supporting structure of the adjacent module in electrically conductive and fixed relation.

In one embodiment, the supporting structure is formed in a checkerboard pattern and is of generally skeletal shape. In this case, the fuel cell battery may be provided with a gas supply duct for supplying gas into each module to flow over the supporting structure thereof and with a two-part line between the supporting structures to form an electrical connection therebetween. In addition, the line may extend through the gas supply duct.

In another embodiment, the supporting structure may be in the form of a metal sheet. In particular, the supporting structure may include a pair of plates which define a flow path for air therebetween for the purpose of heat exchange with a flow of hot gas on an opposite side from the electrochemically active plate.

In accordance with the invention, the contact elements may be filamentary. In this case, the filamentary contact elements may be disposed in bunches with each bunch secured to the supporting structure while the individual contact elements splay outwardly into point contact with the electrochemically active plate.

In another embodiment, a resilient metal web is secured to at least one electrode layer of the chemically active plate of a module while the contact elements are in a form of tongues which extend from the web into electrically conductive fixed contact with the supporting structure.

In still another embodiment, the supporting structure may be made of an electrically conductive ceramic while the contact elements are in the form of ribs with contact surfaces secured, as by sintering, on the electrochemically active plate.

These and other objects and advantages of the invention will become more apparent from the following detailed description taken in conjunction with the accompanying drawings wherein.

Figure 1:
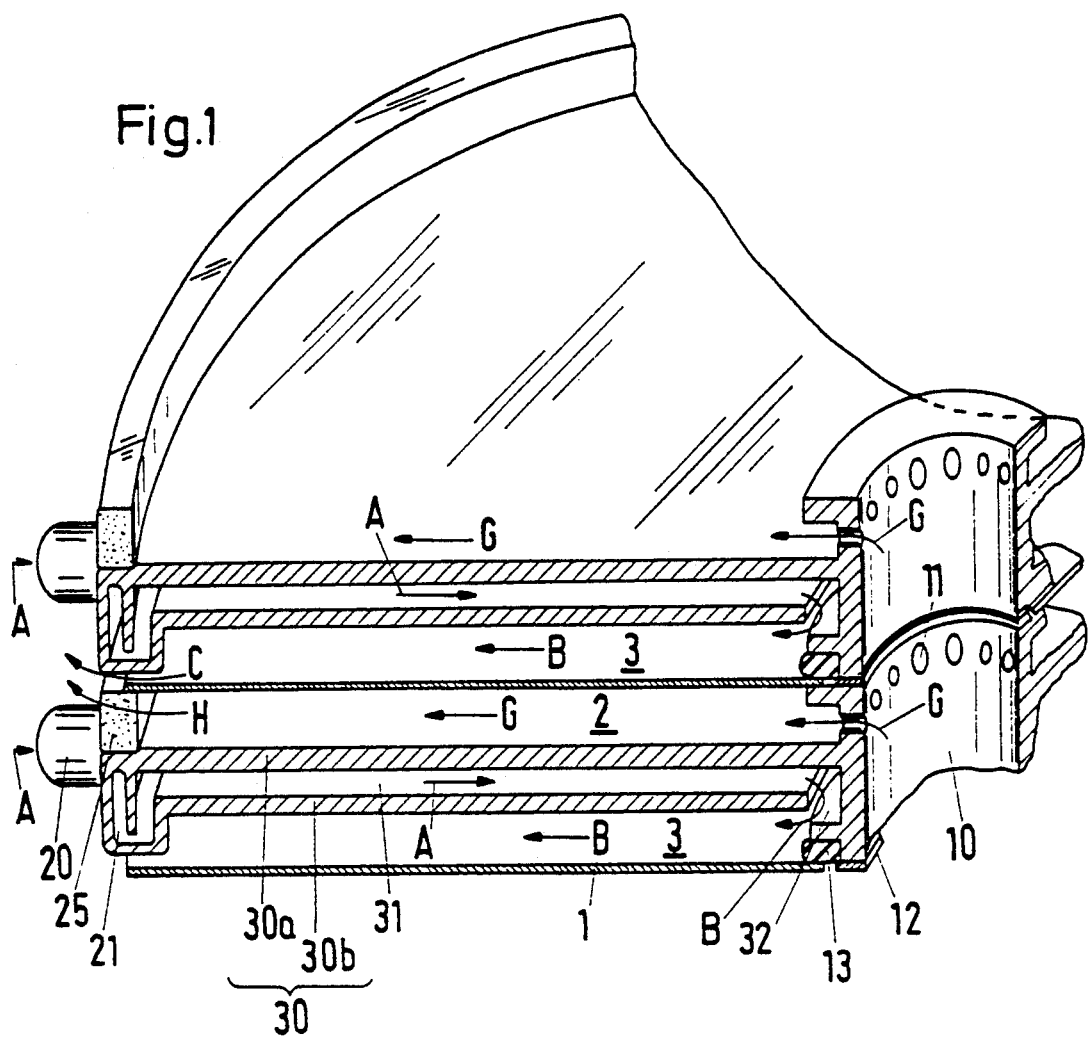
FIG. 1 illustrates a broken away perspective view of a centrally symmetrical fuel cell battery of basic structure.

Referring to FIG. 1, a centrally symmetrical fuel cell battery is generally constructed of stacked cells or modules each of which has an electrochemically active plate 1. In addition, a fuel gas, hereinafter referred to simply as gas, is fed through a central supply duct 10 into an anode chamber 2 of each cell via a plurality of holes 11 (arrows G). The central tube 10 is made up of segments between which electrically insulating rings 12 are disposed. A gasket 13 provides a gas-impermeable separation between adjacent cells in the central zone.

Fresh air (arrows A) which is preheated in an external recuperator flows via a spigot 20 into an annular duct 21 and is distributed over the periphery of each fuel cell. At the same time, the air is heated by heat radially supplied from a heat-exchanger member 30 over which the fuel gas flows. After further heating in a cavity 31 between two plates 30a, 30b forming the heat-exchanger member 30, the air flows centrally through an annular gap 32 into a cathode chamber 3 (arrows B).

The used air (arrow C) and the used gas (arrow H) leave the fuel cells at the outer periphery of the stack thereof with the gas flowing off through a porous annular wall 25. Post-combustion of the air (C) and of the gas (H) immediately after leaving the fuel cells can take place in an annular chamber between a housing wall (not shown) and the surface of the stack of cells. The gas and air may alternatively be collected separately and only then subjected to post-combustion externally.

Figure 2:
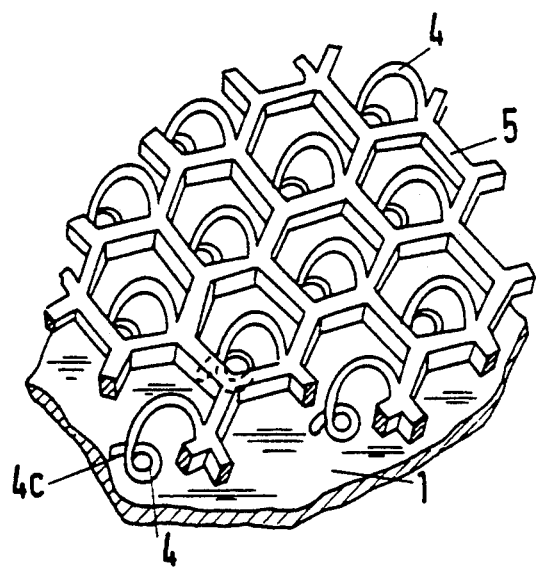
FIG. 2 illustrates a supporting and electron conduction structure for a fuel cell module according to the invention.

Referring to FIG. 2, in accordance with the invention, a fuel cell battery similar to that as illustrated in FIG. 1 may be constructed with an electrochemically active plate 1 mechanically reinforced by a supporting and electron conduction structure space from and in parallel with the plate 1. As indicated, a plurality of regularly disposed contact elements 4 are secured to and between the structure 5 and the plate 1 in electrically conductive and fixed relation.

As indicated in FIG. 2, the supporting structure 5 is of a checkerboard pattern of skeletal shape while the contact elements 4 are wire connections to the checkerboard structure 5. In addition, each contact element forms a point contact with the plate 1 at a contact location 4c. In the illustrated embodiment, the contact locations 4c form a hexagonal point checkerwork. The contact elements 4 are fixed on the electrode layer (not shown) of the plate so as to be non-detachable, e.g. by soldering. The contact elements 4 may be flexible so that they can resiliently respond to changes in the size of the electrochemically active plate 1 due to thermal expansion. Of course the contact elements 4 must be sufficiently rigid to provide support for the electrochemically active plate 1.

The other side of the electrochemically active plate 1 may be provided with an identical supporting and electron conduction structure 5. To obtain a series circuit, adjacent modules of a fuel cell battery may be electrically connected by connecting the electron conduction structures 5 by leads. This connection of adjacent modules is advantageously effected via a two-part line which may be taken through the gas supply duct 10 (see FIG. 1) of the fuel cell battery, where a pressure-biased contact location is provided. The reducing gas environment ensures that the electrical connection at this contact point is not adversely affected by oxidation.

Figure 3:
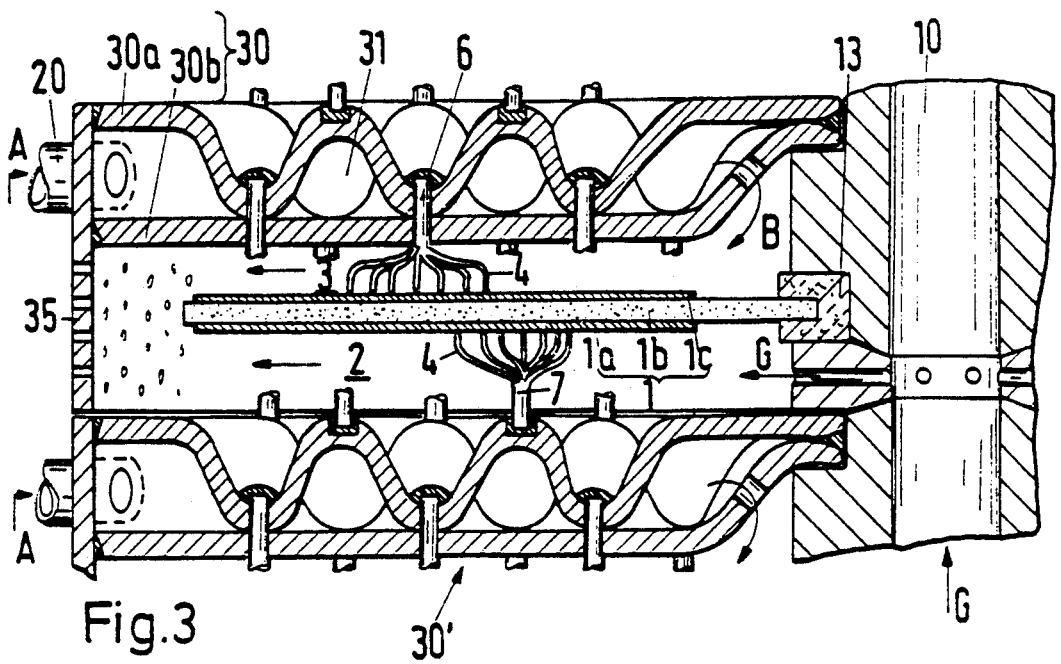
FIG. 3 illustrates a section through a modified module according to the invention.
Figure 4:
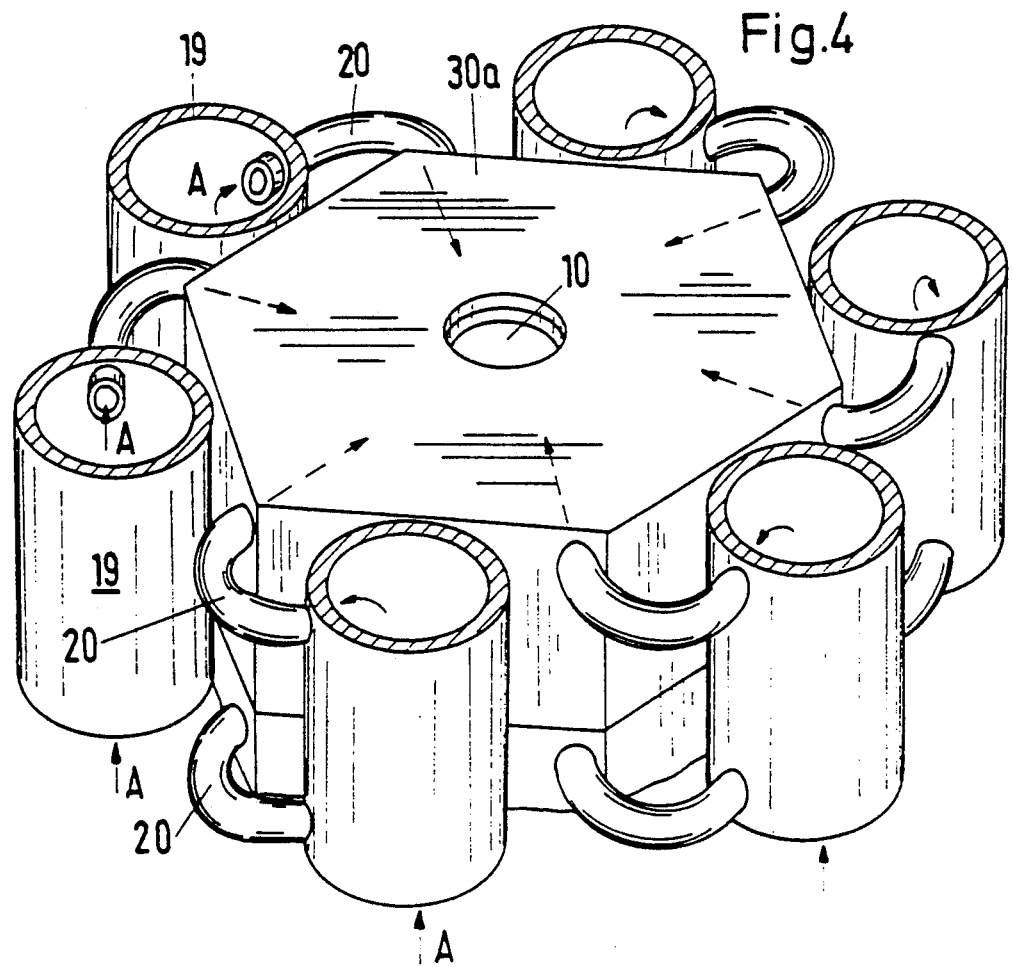
FIG. 4 illustrates fresh air supply to the module of FIG. 3.
Figure 5:
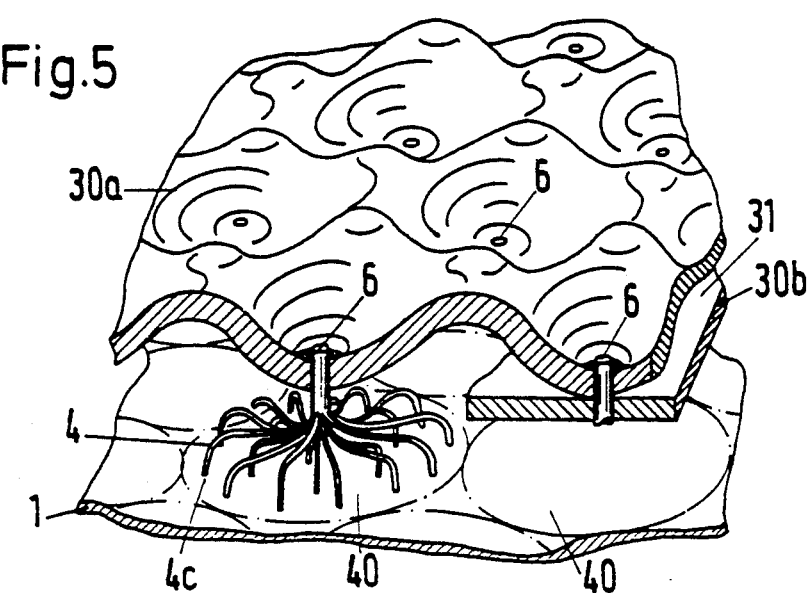
FIG. 5 illustrates a detail of the supporting and electron conduction structure of FIG. 3.

Referring to FIGS. 3 to 5, wherein like reference characters indicate like parts as above, the module for a fuel cell battery may be constructed with an electrochemically active plate 1 including an oxide-ion-conducting solid electrolyte layer 1b and a pair of electrode layers 1a, 1c on opposite sides of a solid electrolyte layer 1b. As indicated, the electrolyte layer 1b is mounted in a gasket 13 which, in turn, is disposed between the central tube segment.

In addition, a supporting and electron conduction structure is spaced from and in parallel with the plate 1. This structure is in the form of a heat exchanger 30, 30 prime which is formed by a pair of plates 30a, 30b, which, in turn, define a flow path for air therebetween for the purpose of heat exchange with a flow of hot gas on an opposite side of the heat exchanger from the active plate 1. These plates 30a, 30b are formed of a metal which is resistant to high temperature, e.g., a nickel based alloy of the kind used in gas turbine blades. In order to improve the heat transfer to the air flowing in a cavity 31 between the plates 30a, 30b, the top plate 30a is provided with hexagonally disposed projections and recesses. Of note, in FIG. 4, this plate 30a is shown flat for the sake of simplicity. In addition, the plates 30a, 30b are interconnected at the recesses.

Referring to FIG. 3 and 5, a plurality of regularly disposed contact elements 4 are secured to and between the heat exchangers 30 and the plate 1 in electrically conductive fixed relation. As indicated, the contact elements 4 are of filamentary construction and are disposed in bunches 6 with each bunch 6 being secured to the heat exchanger 30. As illustrated, the contact elements 4 are S-shaped pieces of wire which define a bunch 6 which passes through bores in the plates 30a, 30b and which are soldered in place.

Referring to FIG. 5, the contact locations 4c are each disposed uniformly over a circular (or hexagonal) zone 40 of the surface of the electrochemically active plate 1, the cathode layer 1c (FIG. 3) being completely covered by such zones 40. No electrochemical reaction takes place at the transitions between the electrode layer and the contact elements, i.e. the contact locations 4c. These transitions should therefore occupy no more than ten, and preferably less than one, percent of the electrode surface.

As shown in FIG. 3, the electron conduction structure of the anode layer 1a can also be made by way of wire bunches 7 as in the cathode chamber 3. These wire bunches 7 can be soldered to the projections of the adjacent heat-exchanger member 30'. This connection also provides a series connection to the adjacent module. Unlike the embodiment of FIG. 2, the electrical connection in this case is via a plurality of locations distributed uniformly over the entire electrode zone, this giving a better electron transport due to more uniform current densities.

The contact elements 4 are thin wires responding flexibly to different thermal expansion of the electrolyte layer 1b and of the heat-exchanger member 30. Since the electrolyte layer 1b is also resiliently held by the gasket 13, which may for example consist of a ceramic felt, it is possible to avoid any damage to the electrochemically active plate 1 by thermal stresses.

With regard to FIG. 3 the anode chamber 2 and the cathode chamber 3 may communicate at the outer periphery so that the consumed gas and consumed air may mix with one another. Post-combustion can take place on the outer surface of the perforate wall 35.

Referring to FIG. 4 the stacked modules of the fuel cell battery may be connected to feed lines 19 for fresh air (arrows A) via connecting lines 20.

Figure 6:
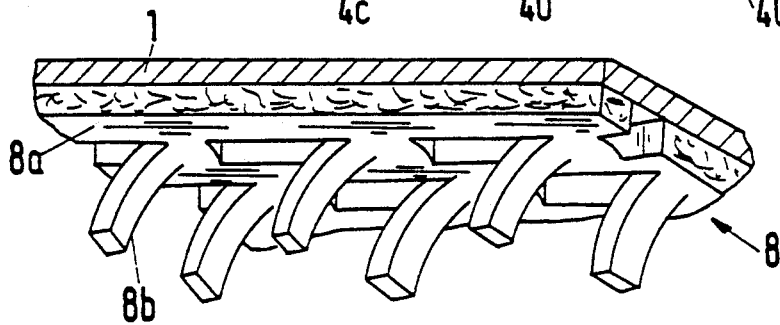
FIG. 6 illustrates a part-perspective view of an electron conduction structure made of a metal web in accordance with the invention.

Referring to FIG. 6, assembly of the fuel cell battery by stacking the modules 1 upon another may be facilitated by having a resilient metal web 8a which is permeable to the gas secured to the anode electrode layer of the electrochemically plate 1, e.g., by soldering or sintering. In this case, the contact elements are in the form of a plurality of regularly disposed tongues 8b which are stamped out of the metal web 8a and are used to make the electrical connection with a supporting structure of the adjacent module. This connection, which is established at the contact locations between the tips of the tongues 8b and plate 30a (not shown), can be stabilized mechanically, for example, by sintering.

Figure 7:
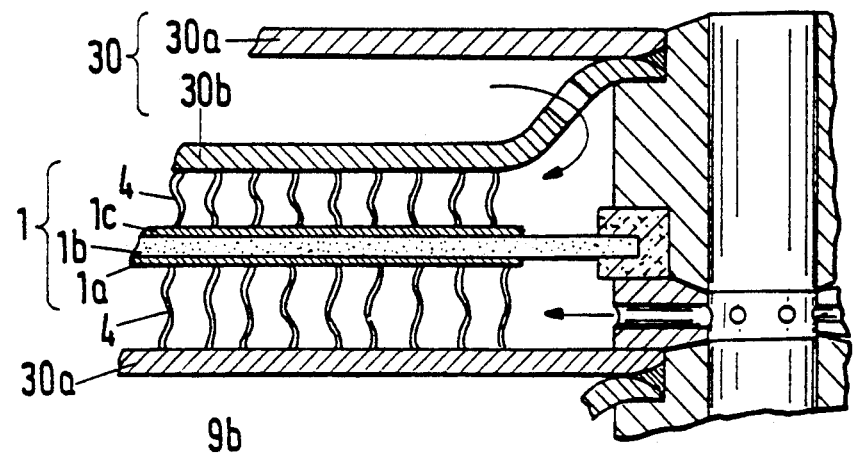
FIG. 7 illustrates a module in the form of a can in accordance with the invention.

FIG. 7 shows another exemplified embodiment in which supporting and electron conduction structures are disposed on both sides of the electrochemically active plate 1 and are formed by wire connections 4 and metal sheets 30a, 30b respectively. These sheets 30a, 30b are the side surfaces of the module and in the assembled fuel cell battery form the two plates of the heat-exchanger member 30. In a module of this kind, the electrochemically active plate 1 is screened from any harmful effects as in a can.

Figure 8:
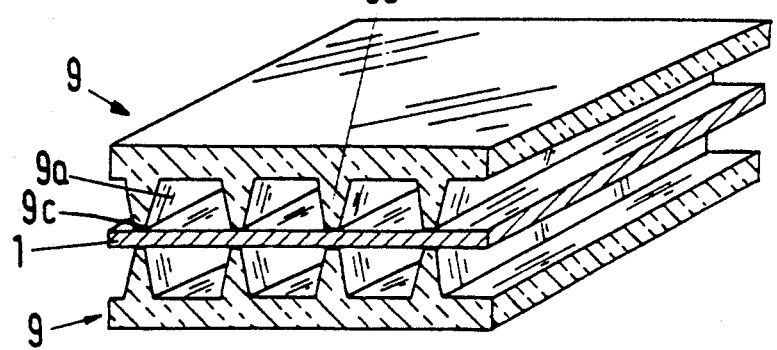
FIG. 8 illustrates a supporting and electron conduction structure made of electrically conductive ceramic.

In the above-described exemplified embodiments, the supporting and electron conduction structures consist of metal. Alternatively, these structures may at least partially consist of electrically conductive ceramics, for example as shown in FIG. 8, a ceramic member 9 with parallel grooves 9a, while the contact elements 9b are in the form of ribs with contact surfaces 9c which, for example, are sintered on the electrochemically active plate 1. These ceramic members 9 constitute a mechanical reinforcement while, in addition, the electron transport can take place through them.

The invention thus provides a module for a fuel cell battery in which an electrochemically active plate which is, of itself, very fragile can be reinforced thus greatly reducing the risk of breakage on assembly of the module.

What is claimed is:

1. A fuel cell battery comprising a plurality of stacked modules electrically connected in series;

each module having an electrochemically active plate including a pair of electrode layers and an oxide-ion-conducting solid electrolyte layer between said electrode layers, a supporting and electron conduction structure spaced from said plate, a first plurality of contact elements secured to and between said supporting structure and one of said electrode layers in electrically conductive and fixed relation, and a second plurality of contact elements secured to and between the other of said electrode layers and said supporting structure of an adjacent module in electrically conductive and fixed relation.

2. A fuel cell battery as set forth in claim 1 which further comprises a gas supply duct for supplying gas into each said module to flow over said supporting structure thereof and a two-part line between said supporting structures to form an electrical connection therebetween, said line extending through said gas supply duct.

3. A fuel cell battery as set forth in claim 1 wherein each said contact element is in point contact with said respective electrode layer.

4. A module for a fuel cell battery comprising
an electrochemically active plate including an oxide-ion-conducting solid electrolyte layer and a pair of electrode layers, each electrode layer being disposed on an opposite side of said solid electrolyte layer from the other electrode layer;
a supporting and electron conduction structure spaced from and in parallel with said plate; and
a plurality of regularly disposed contact elements secured to and between said structure and one of said electrode layers of said plate in electrically conductive and fixed relation wherein each contact element is soldered to said one electrode layer.

5. A module for a fuel cell battery comprising
an electrochemically active plate including an oxide-ion-conducting solid electrolyte layer and a pair of electrode layers, each electrode layer being disposed on an opposite side of said solid electrolyte layer from the other electrode layer;
a supporting and electron conduction structure spaced from and in parallel with said plate; and
a plurality of regularly disposed contact elements secured to and between said structure and one of said electrode layers of said plate in electrically conductive and fixed relation wherein said contact elements are secured to said one electrode layer over a total surface area of less than ten per cent of the total surface area of said one electrode layer.

6. A module for a fuel cell battery comprising
an electrochemically active plate including an oxide-ion-conducting solid electrolyte layer and a pair of electrode layers, each electrode layer being disposed on an opposite side of said solid electrolyte layer from the other electrode layer;
a supporting and electron conduction structure spaced from and in parallel with said plate; and
a plurality of regularly disposed contact elements secured to and between said structure and one of said electrode layers of said plate in electrically conductive and fixed relation wherein said contact elements are filamentary.

7. A module as set forth in claim 6 wherein said filamentary contact elements are disposed in bunches with each bunch being secured to said supporting structure.

8. A module as set forth in claim 7 wherein said structure has a plurality of bores, each bore receiving a respective one of said bunches therein in soldered relation.

9. A module for a fuel cell battery comprising
an electrochemically active plate including an oxide-ion-conducting solid electrolyte layer and a pair of electrode layers, each electrode layer being disposed on an opposite side of said solid electrolyte layer from the other electrode layer;
a supporting and electron conduction structure spaced from and in parallel with said plate;
a plurality of regularly disposed contact elements secured to and between said structure and one of said electrode layers of said plate in electrically conductive and fixed relation; and
a resilient metal web secured to at least one electrode layer of said plate and said contact elements are in the form of tongues extending from said web into electrically conductive fixed contact with said supporting structure.

10. A module for a fuel cell battery comprising
an electrochemically active plate including an oxide-ion-conducting solid electrolyte layer and a pair of electrode layers, each electrode layer being disposed on an opposite side of said solid electrolyte layer from the other electrode layer;
a supporting and electron conduction structure spaced from and in parallel with said plate; and
a plurality of regularly disposed contact elements fixedly connected to and between said structure and one of said electrode layers of said plate in an electrically conductive and fixed relation for reducing the risk of breakage of said plate during assembly of the module wherein each contact element is soldered to said one electrode layer.

11. A module for a fuel cell battery comprising
an electrochemically active plate including an oxide-ion-conducting solid electrolyte layer and a pair of electrode layers, each electrode layer being disposed on an opposite side of said solid electrolyte layer from the other electrode layer;
a supporting and electron conduction structure spaced from and in parallel with said plate; and
a plurality of regularly disposed contact elements fixedly connected to and between said structure and one of said electrode layers of said plate in an electrically conductive and fixed relation for reducing the risk of breakage of said plate during assembly of the module wherein said contact elements are secured to said one electrode layer over a total surface area of less than ten percent of the total surface area of said one electrode layer.

12. A module for a fuel cell battery comprising
an electrochemically active plate including an oxide-ion-conducting solid electrolyte layer and a pair of electrode layers, each electrode layer being disposed on an opposite side of said solid electrolyte layer from the other electrode layer;
a supporting and electron conduction structure spaced from and in parallel with said plate; and
a plurality of regularly disposed contact elements fixedly connected to and between said structure and one of said electrode layers of said plate in an electrically conductive and fixed relation for reducing the risk of breakage of said plate during assembly of the module wherein said contact elements are filamentary.

13. A module as set forth in claim 12 wherein said filamentary contact elements are disposed in bunches with each bunch being secured to said supporting structure.

14. A module as set forth in claim 13 wherein said structure has a plurality of bores, each bore receiving a respective one of said bunches therein in soldered relation.

15. A module for a fuel cell battery comprising
an electrochemically active plate including an oxide-ion-conducting solid electrolyte layer and a pair of electrode layers, each electrode layer being disposed on an opposite side of said solid electrolyte layer from the other electrode layer;
a supporting and electron conduction structure spaced from and in parallel with said plate;
a plurality of regularly disposed contact elements fixedly connected to and between said structure and one of said electrode layers of said plate in an electrically conductive and fixed relation for reducing the risk of breakage of said plate during assembly of the module; and
a resilient metal web secured to at least one electrode layer of said plate and said contact elements are in the form of tongues extending from said web into electrically conductive fixed contact with said supporting structure.

* * * * *

UNITED STATES PATENT AND TRADEMARK OFFICE
CERTIFICATE OF CORRECTION

PATENT NO. : 5,270,131
DATED : December 14, 1993
INVENTOR(S) : Deithelm et al.

It is certified that error appears in the above-indentified patent and that said Letters Patent is hereby corrected as shown below:

Column 4, line 57, change "FIG." to --FIGS.--;

Column 4, line 66, change "30band" to --30b and --;

Column 5, line 39, change "electrochemically plate" to -- electrochemically active plate--.

Signed and Sealed this

Seventh Day of March, 1995

Attest:

BRUCE LEHMAN

*Attesting Officer*          *Commissioner of Patents and Trademarks*